United States Patent
Hahn et al.

(10) Patent No.: US 9,433,029 B2
(45) Date of Patent: Aug. 30, 2016

(54) NETWORK DEVICE IN A COMMUNICATION NETWORK AND METHOD FOR PROVIDING COMMUNICATIONS TRAFFIC BREAKOUT

(71) Applicant: NOKIA SOLUTIONS AND NETWORKS OY, Espoo (FI)

(72) Inventors: Wolfgang Hahn, Bergfelde (DE); Seppo Ilmari Vesterinen, Oulunsalo (FI); Matti Einari Laitila, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 37 days.

(21) Appl. No.: 14/507,450

(22) Filed: Oct. 6, 2014

(65) Prior Publication Data

US 2015/0023254 A1    Jan. 22, 2015

Related U.S. Application Data

(63) Continuation of application No. 13/508,557, filed as application No. PCT/EP2009/064910 on Nov. 10, 2009, now abandoned.

(51) Int. Cl.
*H04W 76/04* (2009.01)
*H04L 12/721* (2013.01)
*H04L 12/701* (2013.01)
*H04L 12/801* (2013.01)
*H04W 88/16* (2009.01)

(52) U.S. Cl.
CPC .............. *H04W 76/04* (2013.01); *H04L 45/00* (2013.01); *H04L 45/72* (2013.01); *H04L 47/10* (2013.01); *H04W 88/16* (2013.01)

(58) Field of Classification Search
CPC ........................... H04W 8/082; H04W 76/025
See application file for complete search history.

(56) References Cited

U.S. PATENT DOCUMENTS

| | | | |
|---|---|---|---|
| 2005/0281277 A1* | 12/2005 | Killian | 370/412 |
| 2006/0002324 A1* | 1/2006 | Babbar | H04L 29/1232 370/325 |
| 2009/0268668 A1* | 10/2009 | Tinnakornsrisuphap et al. | 370/328 |

FOREIGN PATENT DOCUMENTS

| | | |
|---|---|---|
| WO | 2008/125729 A1 | 10/2008 |
| WO | WO 2008125729 A1 * | 10/2008 |

OTHER PUBLICATIONS

International Search Report and Written Opinion corresponding to International Application No. PCT/EP2009/064910 dated Apr. 16, 2010.

(Continued)

*Primary Examiner* — Andrew Chriss
*Assistant Examiner* — Romani Ohri
(74) *Attorney, Agent, or Firm* — Squire Patton Boggs (US) LLP

(57) ABSTRACT

According to an exemplary embodiment of the invention a network device may be provided which may comprise a receiving unit, a sending unit and an evaluating unit. It may be foreseen that the receiving unit may be adapted to receive a trigger signal for preparing a breakout of a plurality of packets, wherein the plurality of packets may comprise at least one packet from a first source and at least one packet from a second source and wherein the evaluating unit may be adapted to evaluate the trigger signal. Moreover, the evaluation unit may be adapted to evaluate packets from a first source and packets from a second source and the evaluation unit may be adapted to distinguish packets from the first source from packets from the second source.

21 Claims, 10 Drawing Sheets

(56) References Cited

OTHER PUBLICATIONS

3GPP: "3rd Generation Partnership Project; Technical Specification Group Services and System Aspects; Local IP Access and Selected IP Traffic Offload; (Release 10)", 3GPP TR 23.8xy V0.2.0 (Sep. 1, 2009), XP050398685, pp. 1-19.

3GPP TR 23.894 V1.2.0: "3rd Generation Partnership Project; Technical Specification Group Services and System Aspects; System enhancements for the use of IMS services in local breakout and optical routing of media; (Release 9)", Sep. 25, 2009, XP002575659, pp. 1-47.

Motorola, "Solution for Local IP Access and Selected IP Traffic Offload Using Local PDN Connection", 3GPP TSG SA WG Meeting #75, TD S2-095220, Aug. 31, 2009, pp. 1-4.

3GPP TS 36.413 V8.7.0: "3rd Generation Partnership Project; Technical Specification Group Radio Access Network; Evolved Universal Terrestrial Radio Access Network (E-UTRAN); S1 Application Protocol (S1AP) (Release 8)", Sep. 1, 2009, pp. 1-219.

3GPP TS 23.401 V8.6.0: "3rd Generation Partnership Project; Technical Specification Group Services and System Aspects; General Packet Radio Service (GPRS) enhancements for Evolved Universal Terrestrial Radio Access Network (E-UTRAN) access (Release 8)", Jun. 1, 2009, pp. 1-227.

\* cited by examiner

NETWORK DEVICE IN A COMMUNICATION NETWORK AND METHOD FOR PROVIDING COMMUNICATIONS TRAFFIC BREAKOUT

CROSS-REFERENCE TO RELATED APPLICATIONS

This application is a continuation of U.S. patent application Ser. No. 13/508,557, filed May 8, 2012, which is the National Stage of International Application No. PCT/EP2009/064910, filed Nov. 10, 2009.

TECHNICAL FIELD

Embodiments of the present invention relate generally to mobile communications, and, more particularly, relate to a network device and a method for communications traffic breakout.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. The functionality of mobile communications devices continues to expand and, as a result, mobile communications devices have become ubiquitous in both business and personal settings. As the functionally of mobile communications devices and the ease of information transfer continues to increase, users continue to demand more functionality that allows the users to quickly find and interact with more data in unique ways.

Some users expect mobile communication devices to be as powerful as conventional computing systems and offer the same types and levels of network connectivity in a wireless package. Many users desire streamlined connections with both local area networks (LANs) and other networks, such as the Internet, that area available via through a communications core network for mobile communications.

There may be a need to provide an access simultaneously to a first network and to a second network.

BRIEF SUMMARY

Various example methods and devices of the present invention are described herein for routing packets, received via a bearer service, to a server, such as server connected to a core network, or breaking out packets from the bearer service and routing packets to a separate network, such as a LAN.

According to an exemplary embodiment of the invention a network device may be provided which may comprise a receiving unit, a sending unit and an evaluating unit. It may be foreseen that the receiving unit may be adapted to receive a trigger signal for preparing a breakout of a plurality of packets, wherein the plurality of packets may comprise at least one packet originating from a first source and at least one packet originating from a second source and wherein the evaluating unit may be adapted to evaluate the trigger signal. Moreover, the evaluation unit may be adapted to evaluate packets originating from a first source and packets originating from a second source and the evaluation unit may be adapted to distinguish packets originating from the first source from packets originating from the second source.

The network device may be a network apparatus, which may receive and send packets from different sources, respectively. The packets may be IP packets, which may comprise a source IP address, which may be utilized in order to prepare a breakout.

According an exemplary embodiment of the invention the network device may be adapted to analyzing the packets received via a bearer service, forwarding packets from the first source to a server via the bearer service, and breaking out, from the bearer service, packets from the second source and routing the packets from the second source to a separate network.

According to an exemplary embodiment of the invention the breakout may be UE initiated. The initiation may be provided by a trigger event or a trigger signal. The UE may move into a cell where a breakout service may be provided. Thus, the movement of the UE may initiate a breakout in that cell.

According to an exemplary embodiment of the invention the breakout may be network initiated.

This may be possible by a receiving information or an information message sent by a network device installed within the network, for example within the EPC or a operator network.

According to an exemplary embodiment of the invention the network device may comprise a local interface.

An interface may be a local interface SGi interface to a S-GW. Another interface may be a local interface L-SGi (Local SGi) to a local IP network.

According to an exemplary embodiment of the invention the network device may comprise at least one BOGW-function (BOGW=Breakout-Gateway), which BOGW-function may be for example routing of packets, routing of uplink packets, collecting of UL statistics (UL=uplink), collecting of DL (downlink) statistics, gateway bridging, downlink packet buffering, ECM-IDLE mode downlink packet buffering, initiating of network triggered service request procedure, assisting in UE IP-address allocation for accessing a home based network, DHCPv4-functions, DHCPv6-functions, providing server functionalities, providing relay functionalities, providing client functionalities and providing downlink local packets in a tunnel, especially providing an inclusion of downlink local packets in a GTP tunnel at an S1-U interface. It may also be possible to provide routing of uplink UE IP packets according to UE IP source address to a L-SGi or to a PDN-GW. Further examples for a BOGW-function may be providing local IP address signaling in control messages and providing local IP address signaling in control messages (GTP, NAS), meaning providing local IP address signaling in control messages, such as GTP and NAS and providing downlink local packets in a tunnel, especially providing an inclusion of downlink local packets in a GTP tunnel at an S1-U interface.

According to an exemplary embodiment of the invention the network device may be adapted to support a breakout service based on a received information, which information is for example a UE Requested PDN Connectivity, a UE Triggered Service Request, a UE Requested Bearer Resource Modification, a Dedicated Bearer Activation, a Bearer Modification, a Network Triggered Service Request, a S1 Release procedure, a UE-initiated Detach procedure for E-UTRAN, a MME Initiated Dedicated Bearer Deactivation, a UE Requested PDN disconnection and a Create/Update (Default) Bearer Request.

The received information may be a trigger signal for initiating a breakout or an off-load of packets, i.e. IP packets within the network.

According to an exemplary embodiment of the invention the network device may be adapted to provide a local IP address. It may be foreseen that the local IP address may be provided within NAS signaling. It may also be possible that the local IP address may be provided in-band with IP methods, such as DHCP, IPv6, etc., by for example overwriting the IP address in a dual IPv4/IPv6 bearer.

According to an exemplary embodiment of the invention there may be provided a method for providing communications traffic breakout. The method may comprise receiving a trigger signal for preparing a breakout of a plurality of packets, wherein the plurality of packets may comprise at least one packet from a first source and one packet from a second source, evaluating the trigger signal. In addition, the method may comprise evaluating packets from a first source and from a second source and distinguishing packets from the first source from packets from the second source.

According to an exemplary embodiment the method may further comprise analyzing the packets received via a bearer service, forwarding packets from the first source to the server via the bearer service, and breaking out, from a bearer service, packets from the second source and routing the packets from the second source to a separate network.

Another example embodiment is an example computer-readable storage medium having executable computer-readable program code instructions stored therein. The computer-readable program code instructions of the example computer-readable storage medium are for causing a network device to perform various functionalities.

BRIEF DESCRIPTION OF THE DRAWINGS

Embodiments of the present invention are described below with reference to the accompanying drawings, which are not necessarily drawn to scale, wherein.

DETAILED DESCRIPTION

Figure 1:
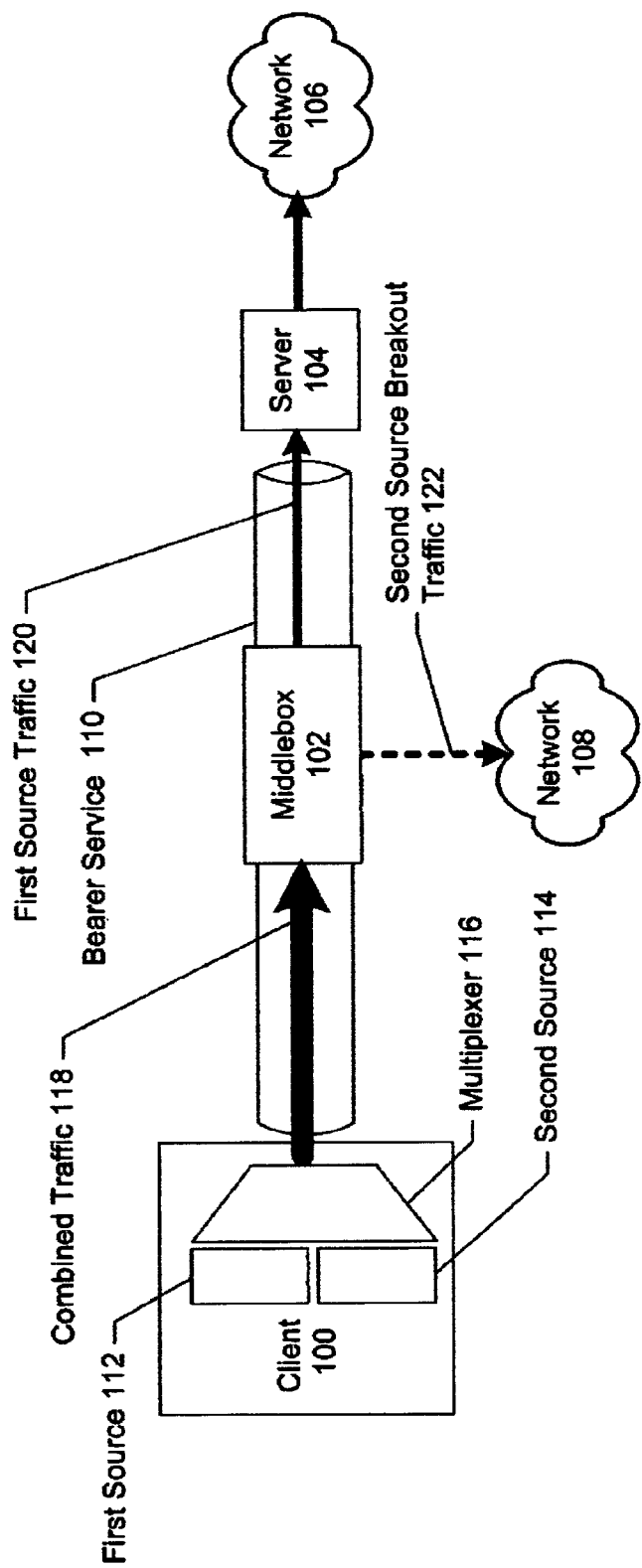
FIG. 1 illustrates a system for communications traffic breakout according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

The illustration of the drawings is schematic. In different drawings, similar or identical elements are provided with the same reference numerals.

Various example embodiments of the present invention support communications traffic breakout from a bearer service. According to various example embodiments, a bearer service may be a type of virtual point-to-point connection or transport service between two network entities or end points. For example, the bearer service may be a packet data protocol (PDP) context and/or a enhanced packet system (EPS) bearer. As such, the bearer service may support long-term evolution (LTE) based communications techniques. The end points of the bearer service may be a client device, such as, for example, user equipment (UE) in the form of a mobile terminal, and a server, such as, for example, a packet data network gateway (PDN-GW) and/or a general packet radio service (GPRS) gateway support node (GGSN). In some example embodiments, a bearer service is a transport service with specific and defined quality of service (QoS) attributes.

According to various example embodiments of the present invention, a client device may maintain a bearer service to a server that provides access to a core network of a wireless communications system. Having established the bearer service with the server, the client device may also wish to communicate, perhaps more locally, with a second, separate network, such as a local area network (LAN). To conduct communications with the second network, the client device may be configured to transmit packets intended for the second network through the bearer service to an intermediate middlebox, wherein the middlebox may be a breakout gateway (BOGW) or a local breakout gateway (L-GW). The middlebox may be configured to forward packets intended for the core network to the server, and breakout and route packets intended to the second network to the second network. Since the packets intended for the second network may be intercepted by the middlebox, the server and the core network may be unaware of the packets intended for the second network. In this manner, simultaneous support for both core network communications and local area network communications may be achieved through multiple interfaces via a single bearer service. Example embodiments therefore support local IP access (LIPA), without visibility, or with limited visibility, to the core network.

To provide for breaking packets intended for the second network out of the bearer service, the client device may establish separate sources for the packets intended for the server, and the packets intended for the second network, respectively. In other words, a first source may be established for communications to the server and the core network, and a second source may be established for communications to the second network. In some example embodiments, the sources may be treated as separate communications interfaces within the client device. In this regard, applications executed on the client device may interact with the sources as physical interfaces, and behave accordingly, such as by performing source address selection.

The packets from each of the separate sources may acquire particular characteristics based on the type of source. A source may be defined, for example, by a distinct source address (e.g., source internet protocol (IP) address) and/or by a communications protocol that is used to generate packets from the particular source (e.g., point-to-point protocol (PPP), internet protocol, Ethernet, or the like). Although the client device may employ more than one source, the packets generated for each of the sources may be transmitted together via the bearer service. In this regard, according to some example embodiments, the packets from each of the sources may be multiplexed and transmitted using a common radio to the bearer service.

In light of the foregoing, FIG. 1 illustrates an example system for communications traffic breakout according to various example embodiments of the present invention. The system of FIG. 1 shows a client 100, a middlebox 102, a server 104, a network 106, and a network 108. The client 100 may be any type of wired or wireless communications device such as a mobile terminal, a laptop computer with a wireless modem, or other type of user equipment. The middlebox 102 may be a network communications entity, such as a base station configured as an enhanced node B (eNB) or a Home eNB (HeNB). The middlebox 102 may provide connections to a server 104 and a network 108. The network 108 may be, for example, local to the middlebox 102 and/or the client 100, and the network 108 may be a wired or wireless LAN, which may be multicast enabled. The server 104 may be another network communications entity, such as a PDN-GW and/or a GGSN. The server 104 may provide a connection to a network 106, which may be the core network.

A bearer service 110 may also be established between the client 100 and the server 104. According to some example embodiments, the bearer service 110 may support a point-to-point connection, and be configured as, for example, a PDP context and/or an EPS bearer. The bearer service 102 may pass through the middlebox 102, and the middlebox 102 may be configured to facilitate maintaining the bearer service 102 between the client 100 and the server 104.

In general, the client 100 may be configured to establish at least two sources (e.g., first source 112 and second source 114) for providing communications traffic via the bearer service 110. Data packets from each of the first source 112 and the second source 114 may be generated having characteristics based on the type of source. According to some example embodiments, the data packets from the sources may be multiplexed by the multiplexer 116 and provided to the bearer service 110 as combined traffic 118. The combined traffic 118 from the client 100 may be received or intercepted by the middlebox 102, and the middlebox 102 may be configured to analyze the packets to determine whether the packets originated from the first source 112 or the second source 114. Packets from the first source may be passed or forwarded to the server 104 as first source traffic 120. Packets from the second source may be broken out of the bearer service 110 and routed as second source breakout traffic 122 to the network 108.

While the example embodiments described herein address situations involving one source (e.g., the second source 114) to support packet breakout from the bearer service, any number of sources may be configured for packet breakout. In this regard, a client device (e.g., during random access signaling or via some other means such as dynamic host configuration protocol signaling) may establish, or be requested to establish, a number of sources and associated interfaces. In this regard, a point-to-point connection via the bearer service 110 to the "Internet" or "Operator intranet" may be established, and sources configured for packet breakout may be configured for the same or different destinations, such as the "Internet", "Corporate Intranet" or "Home network."

According to various example embodiments, packets for the first and second source may be generated in a number of ways. According to some example embodiments, as further described below, a first IP address associated with a first source 112 may be established for the client 100 for use with a point-to-point connection supported by the bearer service 110, and a second, and possibly local, IP address associated with the second source 114 may be established. The second IP address may also be used with the bearer service 110, and the second IP address may be known to the middlebox 102. As such, the middlebox 102 may breakout and route packets having the second IP address to, for example a local network (e.g., network 108).

According to some example embodiments, the second IP address may be determined and utilized in a manner that may not be detected by the server 104, due to the middlebox 102 intercepting and routing the traffic associated with the second IP address to the network 108. To establish the second IP address, client 100 may be notified by the middlebox 102 about possibility for configuration of a second IP address for the bearer service 110. The client 100 may communicate with the middlebox 102 and configure the second IP address and a point-to-point connection. In some example embodiments, the client 100 may select the address unilaterally, while in other embodiments the middlebox 102 may be employed to assist in the selection of a second address. The middlebox 102 may thereafter be configured to inspect the traffic of the bearer service 110, and make forwarding and routing decisions based on addresses (e.g., the source and/or destination addresses) of the packets transmitted from the client 100.

In accordance with another example embodiment, the client 100 may be configured to generate different protocol type packets for the respective sources. For example, packets for the first source may be formatted in accordance with a first protocol (e.g., IP) and packets for the second source may be formatted in accordance with a second protocol (e.g., Ethernet). Alternatively, in some example embodiments, packets for the second source 114 may be generated in a first protocol, and subsequently encapsulated in a second protocol (e.g., Ethernet over IP). Regardless of the specific characteristics of the packets, the middlebox 102 may be configured to distinguish packets for the first source 112 from packets for the second source 114, and route the packets accordingly (e.g., breakout packets form the second source 114).

With respect to routing the communications traffic of the bearer service 110, the middlebox 102 may be configured to pass traffic from the first source 112 in the direction of the server 104 and the network 106 (e.g., the core network) as first source traffic 120. However, the middlebox 102 may also be configured to analyze characteristics of the packets (e.g., the source addresses of the packets, the protocols of the packets, whether an encapsulation of protocols is present, or the like) transmitted from the client 100, and breakout packets from the bearer service 110 based on the analysis. The packets that are broken out of the bearer service 110 may be directed to other destinations, such as network 108, which may be a home network or the Internet.

The following provides additional details of various example embodiments of the present invention. In particular, example embodiments are described for implementing the general concept into a communication network, especially into a communication network providing LIPA services and SIPTO services, for example providing these services according to the 3GPP standardization environment.

In communication networks a mobile device may use more than one service simultaneously. For example a mobile phone may provide a telephone call and may have internet access at the same time. In communication networks using 3GGP technology a so called Local IP Access (LIPA) may be provided which may allow an IP-capable (IP=internet protocol) UE (UE=user equipment), such as a mobile phone, to be connected via a eNB or a HeNB (eNB=e Node B; HeNB=HNB=Home e-Node B; (H)eNB=(Home)eNodeB) over a direct access to other IP-capable devices in a local residential/corporate IP network.

A SIPTO service may be understood as a Selected IP Traffic Offload. With a local interface an offload network may be available due to a SIPTO functionality in a local gateway (L-GW). With the same local interface or another local interface a LAN may be available due to a LIPA functionality the local gateway. In the following if not otherwise explained, there may be no differentiation between the LIPA functionality and the SIPTO functionality. Therefore in the following the term "LIPA/SIPTO" may be utilized. Both functionalities may be utilized in order to provide a breakout via a BOGW into a second network, for example an offload network or a LAN.

It may be assumed that the LIPA/SIPTO services may be provided by using Local IP addresses assigned from the L-GW that may be visible to the client 100 or a UE i.e. the local IP addresses may be configured in an UE IP Stack and may be used for LIPA/SIPTO Bearer Services so that the use of a NAT function may be not necessary.

It should be noted that the use of a Local IP Address in the UE may be different when LIPA/SIPTO service may be supported by using Multiple PDN connectivity. With other words, there may be provided a utilization of separate IP addresses in the UE per each PDN connection. Thus, the LIPA/SIPO service may be managed by using a Multiple PDN Connectivity.

It may be possible that the LIPA/SIPTO service may be visible to the UE also in the "Single APN" based LIPA/SIPTO case. With other words, the UE and the network may support a required session management scenarios and may use Local IP Addresses in order to manage the related EPS Bearer Services for LIPA/SIPTO.

According to an exemplary embodiment of the invention there may be provided solutions for "Single APN" based LIPA/SIPTO Session Management procedures in the LTE/SAE networks. These procedures may have a minimal impact on the Evolved Packet Core (EPC) nodes i.e. the MME and the S-GW or P-GW.

The local breakout point may be assumed to be taken from a co-located L-GW in the (H)eNB supporting LIPA/SIPTO services providing connectivity to Local IP Networks that may, or may not be part of the MNO network.

Figure 2:
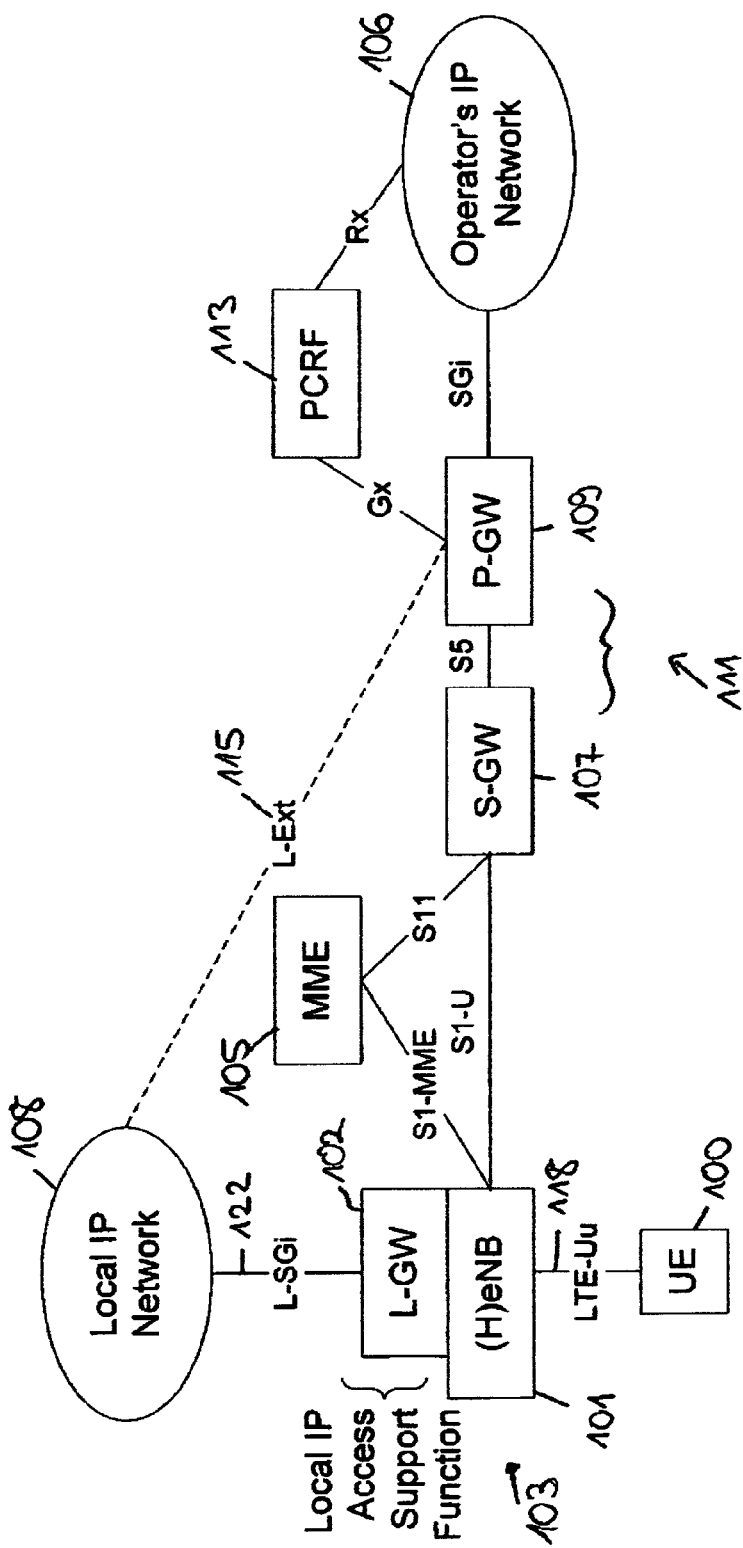
FIG. 2 illustrates a reference architecture to support LIPA and SIPTO in E-UTRAN according to an example embodiment of the present invention.

FIG. 2 shows a LIPA/SIPTO architectural according to an exemplary embodiment of the present invention for the case of E-UTRAN and an eNB, for example a macro eNB. Analogous architectural embodiments may apply for networks comprising a HeNB. Moreover, analogous architectural embodiments may apply for networks comprising a UTRAN, comprising local breakout at least at RNC or at least at HNB level. In the UTRAN case, the GGSN may map onto PDN GW, and SGSN may map onto S-GW and onto MME, wherein the mapping onto S-GW may be a user plane part and the mapping onto MME may be a control plane part.

FIG. 2 shows several network devices 100, 101, 102, 103, 105, 107, 109, 113, which may be interconnected to each other via interfaces, i.e. interfaces LTE-Uu, L-SGi, S1-MME, S1-U, S11, L-Ext, S5, Gx, Rx and SGi. An UE 100 which may communicate via a eNB 101 or a HeNB 101 with an first network 106, which is a IP network. The (H)eNB may be connected with a S-GW 107. The S-GW 107 may be connected via a S5 interface with a P-GW 109. the S-GW 107 and the P-GW 109 may be co-located or combined within one network device 500, a so called S-/P-GW 111. A L-GW 102 may be co-located to the (H)eNB 101.

According to an exemplary embodiment of the present invention the Local Gateway (L-GW) 102 may co-located with the (H)eNB 101 within one network device (H)eNB/L-GW 103. The L-GW 102 may provide several functions for LIPA/SIPTO support. One of these functions may be a Gateway bridging and or routing LIPA/SIPTO Bearer over radio to/from a Local IP Network, e.g. the internet, an enterprise network or home network via a L-SGi. Moreover, the L-GW 102 may provide an ECM-IDLE mode downlink packet buffering and an initiation of a network triggered service request procedure. Furthermore, the L-GW 102 may perform collecting UL traffic statistics and DL traffic statistics. In addition the L-GW 102 may assist in UE IP address allocation to access a home based IP network. The L-GW 102 may also provide DHCPv4 functions (server, relay and client) and also DHCPv6 (server, relay and client) functions.

When the LIPA/SIPTO traffic breaks out to Local IP Networks directly from (H)eNBs it may be assumed that the L-GW function may be a part of the EUTRAN. Thus, the LIPA/SIPTO reference architecture may apply a S1-MME interface for the L-GW (Local Gateway) 102 control signalling in order to keep an existing EUTRAN-EPC split over the S1-Interface untouched. An optional "L-Ext" tunnel 115 may be configured for Managed Remote Connection between the P-GW 109 and a Residential Gateway in the Local IP Network.

Functional assumptions for the LIPA/SIPTO session management may be the following: A LIPA/SIPTO Session Management may be handled at NAS Level either by using Multiple PDN-Support, or within Single PDN Connection by using a modified or a dedicated Bearer Request procedure. From the UE Point of view Local U-Plane handling may be transparent and LIPA/SIPTO Sessions may be mapped either to an UE Requested PDN Connectivity (APN may be associated to local "L-GW"), to a dedicated EPS Bearer (within single APN), or to a modified EPS Bearer (within single APN). Moreover, the MME may comprise an APN handling procedure for an UE Requested PDN connection for LIPA/SIPTO service, or for a dedicated bearer request in the single APN case. There may be UEs which may not provide LIPA/SIPTO capability then a subscription may be supported with an operator controlled SIPTO feature transparently to the UE within single APN. It may be assumed that the UE transparent SIPTO traffic offload or SIPO traffic breakout may happen from the Operator Site and LIPA providing Intranet Type access may require user being aware of service activation. Moreover, the UE may be anchored to the MME on the C-plane. It may be provided that the "Default EPS Bearer" Service may be "Always On" from the S-/P-GW of the EPC. Furthermore, a CSG (Closed Subscriber Group) mechanisms may be used for Mobility Management. In addition, it may be foreseen that a (H)eNB with LIPA/SIPTO may provide a "L-GW" function. In addition, a minimal set of S-GW and P-GW functions may be utilized in (H)eNB for handling "Native IP". A "Native IP" may be a normal IP networking used in IT-technology in contrast to a proprietary 3GPP specified way. The "L-GW" function may be controlled over the S1-MME Interface. Thus, the Core Network Interfaces like S11 may be omitted in (H)eNB by delivering the required LIPA/SIPTO control information in the S1AP (S1 Application protocol) "E-RAB Management Messages". It may be foreseen that the LIPA/SIPTO Service may work based on temporary E-UTRAN identifiers without necessitating storing the user sensitive context data like IMSI locally in the (H)eNB/L-GW.

The following procedures may be applicable for supporting LIPA/SIPTO services: UE Requested PDN Connectivity (Multiple APN based LIPA/SIPTO solution), UE Triggered Service Request, UE Requested Bearer Resource Modification, Dedicated Bearer Activation, Bearer Modification, Network Triggered Service Request (how paging trigger for UE using LIPA/SIPTO can be indicated to the MME), S1 Release procedure, UE-initiated Detach procedure for E-UTRAN, MME Initiated Dedicated Bearer Deactivation and UE Requested PDN disconnection.

An UE Requested PDN Connectivity procedure may apply for the Multiple PDN Connectivity or Multiple APN based LIPA/SIPTO service.

In the following more details in relation to LIPA/SIPTO service management functions or LIPA/SIPTO procedures and methods relating to LIPA/SIPTO may be described, i.e. in relation to a UE Triggered Service Request, UE Requested Bearer Resource Modification, Dedicated Bearer Activation, Bearer Modification, Network Triggered Service Request and S1 Release procedures.

FIG. 3, FIG. 4, FIG. 5, FIG. 6, FIG. 7 and FIG. 8 illustrate examples of message diagrams, respectively, in order show exemplary embodiments for method for providing communications traffic breakout. In these Figures several steps may be indicated by step numbers either in a box or at an arrow. These steps may be performed timely after each other. Moreover, the arrows may indicate a direction of information flow from one network device to another network device. Boxes in these figures may indicate actions taken by a respective network device or decisions to be performed by a respective network device. The text positioned at the respective arrow may indicate a message comprising parameters indicated in brackets.

Figure 3:
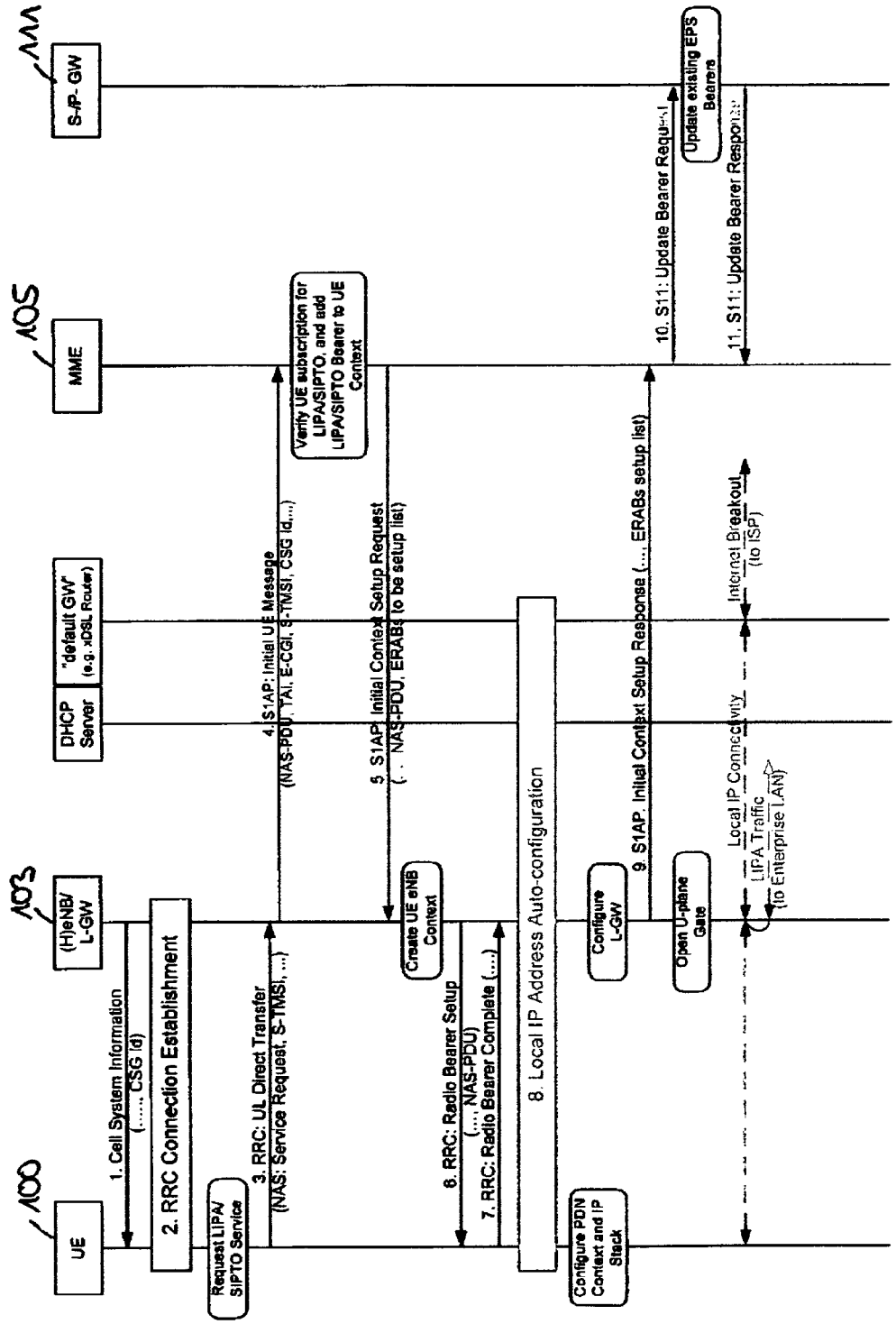
FIG. 3 illustrates a LIPA/SIPTO Bearer Setup procedure using UE Service request according to an example embodiment of the present invention.

FIG. 3 shows a LIPA/SIPTO Bearer Setup procedure using an UE Triggered Service Request according to an exemplary embodiment. The UE Triggered Service Request message, shown in step 3 of FIG. 3, may be executed when the UE 100 may change its status from ECM-IDLE to ECM-ACTIVE state. This procedure may be utilized in order to support either UE requested LIPA/SIPTO Bearer setups or Network Controlled LIPA/SIPTO Bearer setups. In both cases the MME 105 may be assumed to make a decision whether a LIPA/SIPTO Bearer should be added in the UE Context data e.g. based on a movement of the UE to a cell/location where LIPA/SIPTO service is allowed.

The LIPA/SIPTO bearer service to be setup may be either a dedicated bearer or a modified bearer linked to a current PDN connection, which may be especially a single APN, when anew local IP address has to be configured in the UE 100 in addition to configuring the (H)eNB/L-GW accordingly.

A handling of the LIPA/SIPTO bearer service setup upon the UE Triggered Service Request procedure may be the following: The MME 105 may be assumed to be aware of UE membership to a CSG and LIPA/SIPTO may be allowed to the UE. For LIPA/SIPTO bearer handling the MME 105 may comprise one or more profiles (reflecting (different) operator policies and or subscriber types and or (H)eNB backhaul capability) with default values on behalf of the "virtual P-GW" for LIPA/SIPTO services. Moreover, the (H)eNB/L-GW may be configured for LIPA/SIPTO support and may be capable to assist the UE in local IP address allocation and may perform bridging between LIPA/SIPTO Bearer and "native IP" in the local IP network. A MME Initiated Dedicated Bearer Activation for LIPA/SIPTO Service may be triggered by reception of the NAS: "Service Request" message when the UE has entered to a (H)eNB/Cell supporting LIPA/SIPTO (see step 4 in FIG. 3). This message may be utilized for establishing NAS signaling connection and of the radio bearers and S1 bearers. This message may contain S-TMSI and security information for identifying the client or user. In addition, the "Service Request" message may comprise an indication for the UE requesting LIPA/SIPTO bearer service. This indication may be omitted in the case the LIPA/SIPTO bearer activation may be always fully network controlled. In order to trigger Local IP Address configuration in the UE the NAS-PDU in the bearer setup request message, see step 5 in FIG. 3, may comprise an indication e.g. in the protocol options. In order to trigger Local IP Address configuration in the UE the NAS-PDU in the bearer setup request message (see step 5 in FIG. 3) may comprise an indication e.g. in the protocol options. In order to activate LIPA/SIPTO Service in the (H)eNB, the E-RAB parameters may indicate that S1-u is omitted e.g. by issuing null TEID value.

Figure 4:
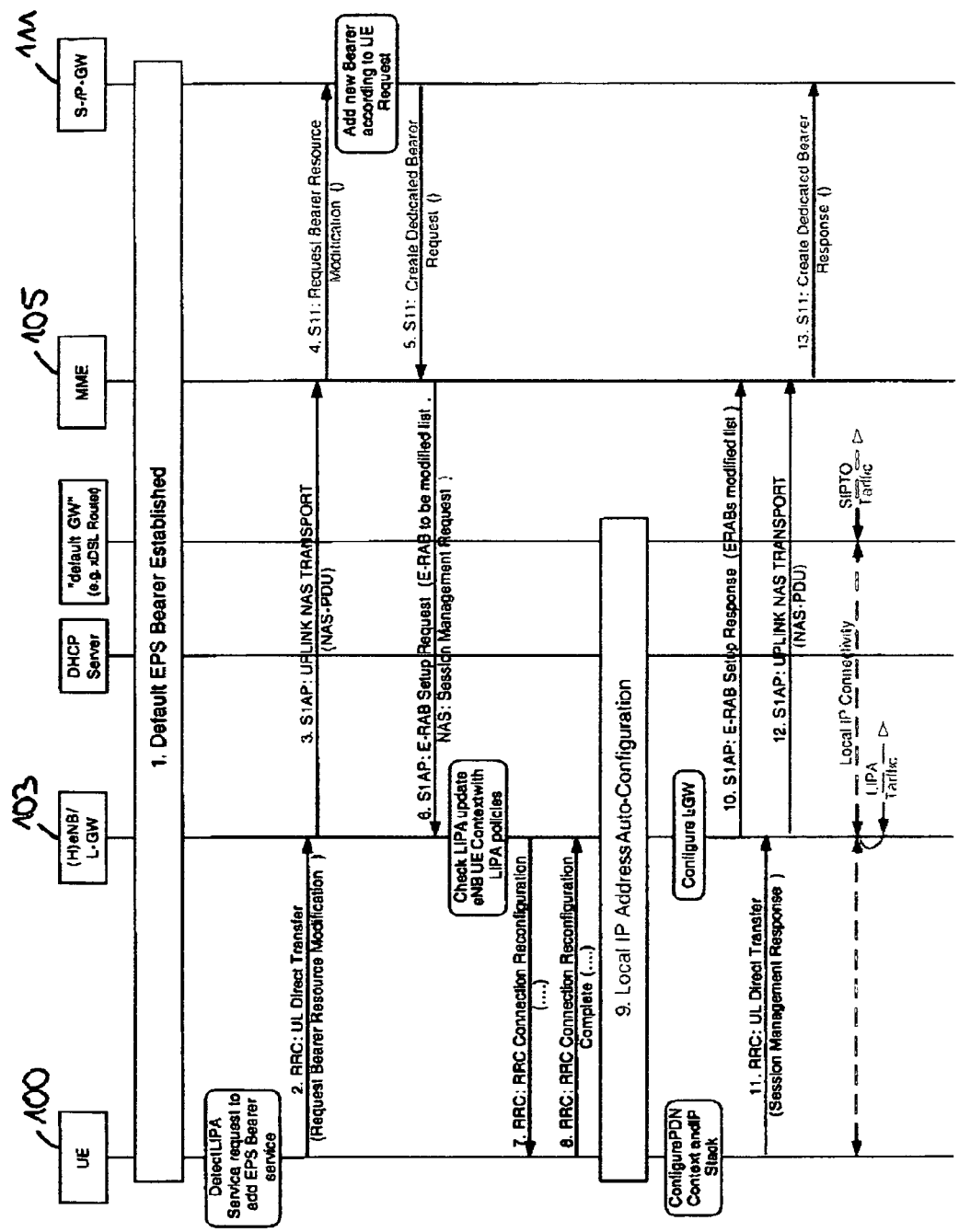
FIG. 4 illustrates a LIPA/SIPTO Bearer Setup procedure using UE requested bearer resource modification procedure resulting to dedicated bearer activation according to an example embodiment of the present invention.
Figure 5:
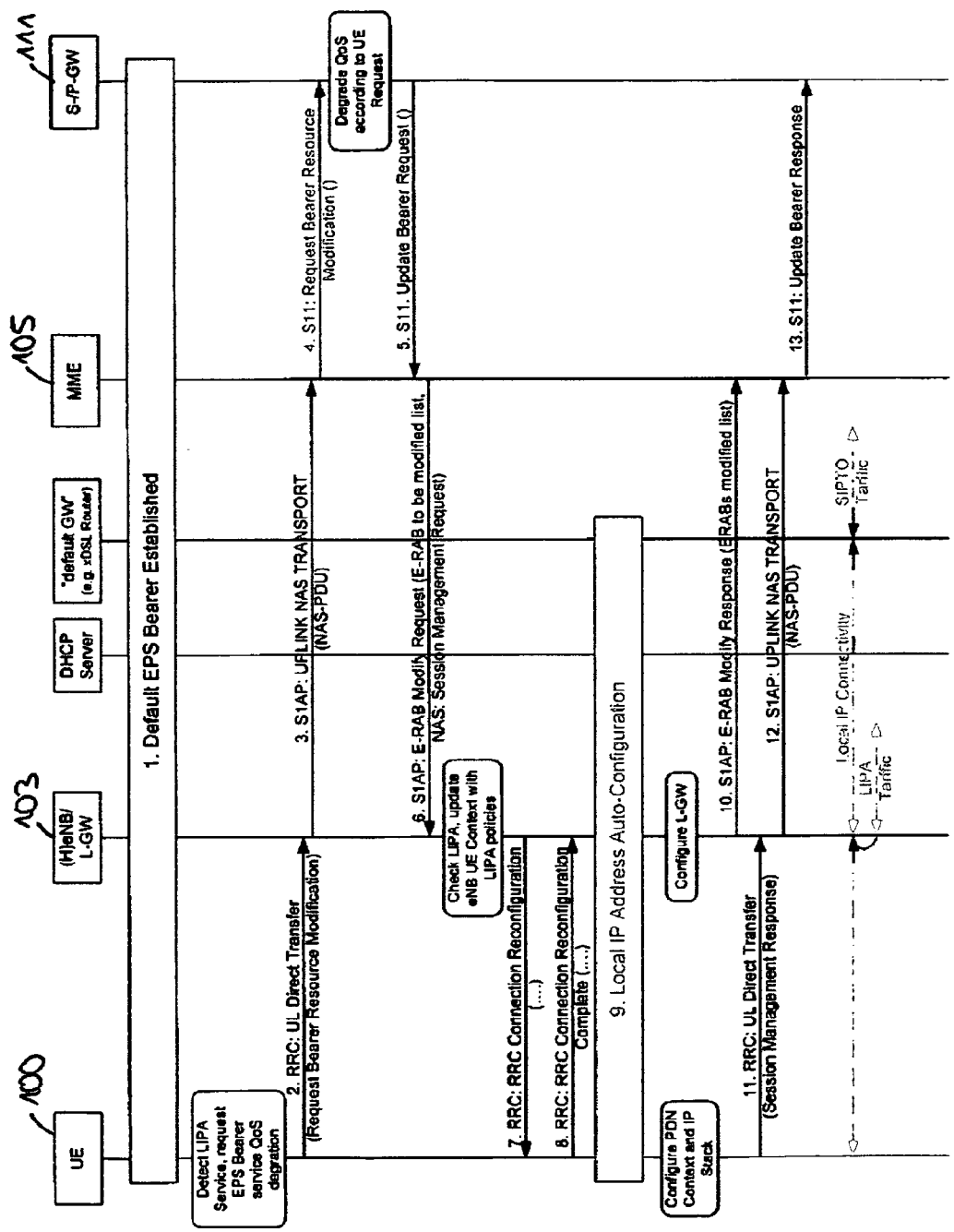
FIG. 5 illustrates a LIPA/SIPTO Bearer Setup procedure using UE requested bearer resource modification procedure resulting to modification of an existing bearer according to an example embodiment of the present invention.
Figure 6:
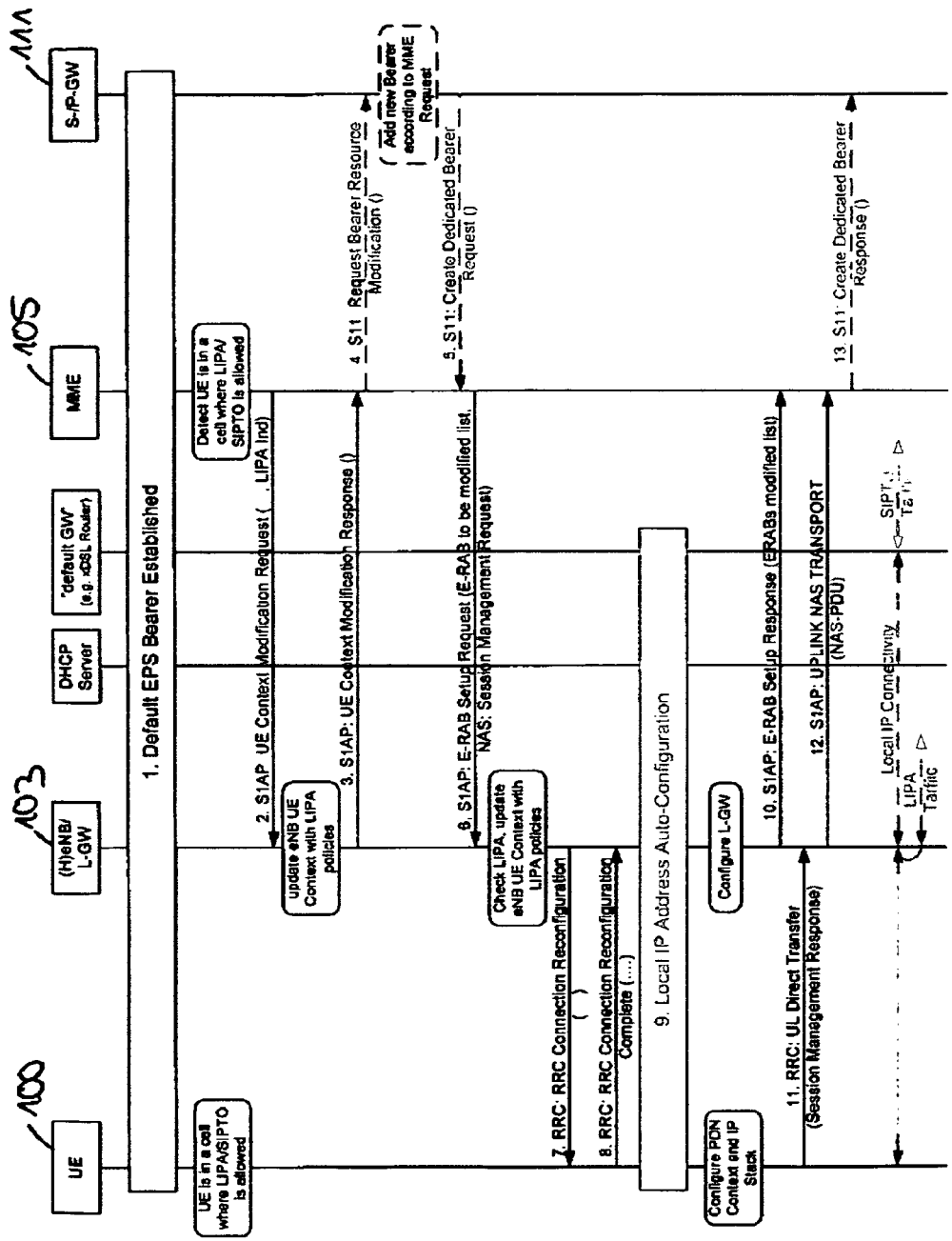
FIG. 6 illustrates a LIPA/SIPTO Bearer Setup procedure using Dedicated Bearer Activation according to an example embodiment of the present invention.
Figure 7:
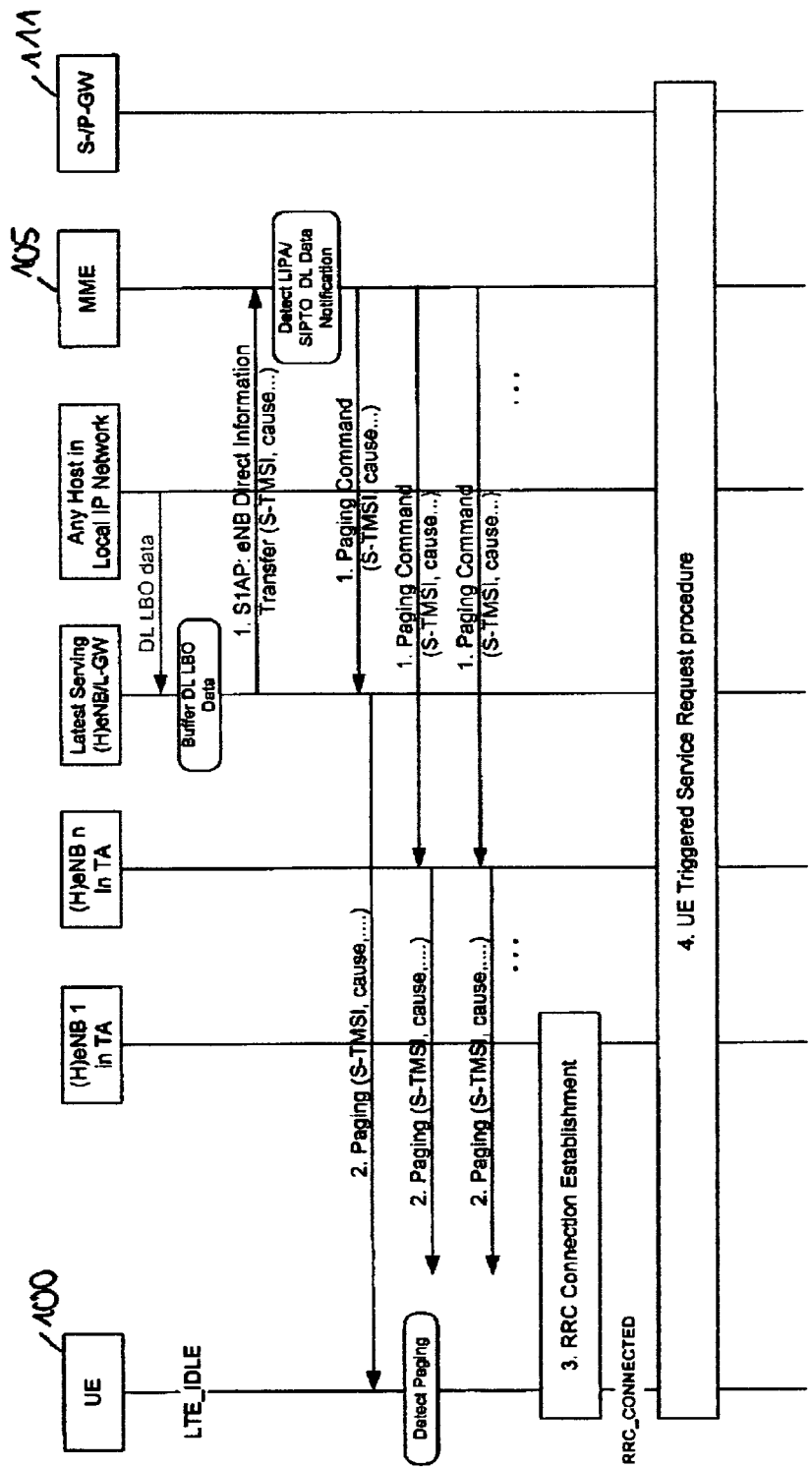
FIG. 7 illustrates a first example of a Local UE Paging Trigger from (H)eNB to MME in LIPA/SIPTO according to an example embodiment of the present invention.

FIG. 4 and FIG. 5 show a LIPA/SIPTO Bearer Setup procedure using UE Requested Bearer Resource Modification according to an exemplary embodiment. The UE Requested Bearer Resource Modification procedure may allow the UE 100 to request for a modification of bearer resources (allocate or release resources) when the UE 100 already has a PDN connection with the S-/P-GW 107, 109 meaning the default EPS Bearer is activated (see step 1 in FIG. 4 and step 1 in FIG. 5). This UE requested Bearer Setup procedure may support LIPA/SIPTO service setups within a single APN by invoking either a dedicated bearer activation or a bearer modification procedure if accepted by the network. The MME 105 may perform an access control for the UE 100 moving to a cell supporting LIPA/SIPTO e.g. based on the CSG membership verification and possible LIPA/SIPTO subscription verification. In the LIPA/SIPTO service setup the UE 100 may request a traffic flow aggregate with a reduced QoS in order to release resources in the PDN GW 109 as the LIPA/SIPTO traffic does no more pass it, and most of the UE generated traffic may be off-loaded.

Handling of the LIPA/SIPTO bearer service setup upon the UE Requested Bearer Resource Modification procedure may comprise the following aspects:

The UE 100 may be aware of LIPA/SIPTO service e.g. in its CSG cell/network according. Moreover, the MME 105 may be assumed to be aware of UE membership to a CSG and LIPA/SIPTO may be allowed to the UE 100 in order to perform the required access control and reject service request when required. In addition, the LIPA/SIPTO bearer management may be transparent to the MME 105 by re-using the existing procedures. The LIPA/SIPTO bearer management may be transparent to the S-GW 107 and P-GW 109 by re-using the existing procedures. (H)eNB/L-GW 101, 102 may be assumed to be configured for LIPA/SIPTO support and may be capable to assist the UE 100 in local IP address allocation and perform bridging between LIPA/SIPTO bearer and "native IP" in the local IP network. It may be foreseen that the UE Requested Bearer Resource Modification procedure for LIPA/SIPTO Service may be triggered by the UE movement to a cell where LIPA/SIPTO service may be enabled e.g. to a CSG cell, or by using some indication from Network. The initiation of the procedure may be automated, or could be done manually by the client or user. It may be foreseen that the UE 100 may be capable to store a pre-provisioned QoS profile for a LIPA/SIPTO service. In addition the UE 100 may be capable to auto-configure local IP address with an assistance of the (H)eNB/L-GW 101, 102 for LIPA/SIPTO bearer service. The UE 100 may be capable to store its IP address assigned from the P-GW 109 and on demand re-configure, or use this IP address for non-LIPA/SIPTO services.

The UE 100 may create and send a NAS: "Request Bearer Resource Modification" message with a specific TAD (Traffic Aggregate Description) for LIPA/SIPTO service and may be delivered via the MME 105 to the S-/P-GW 107, 109. The requested operation in the TAD may be to add, or modify packet filters and the Protocol Configuration Options with address auto-configuration by the UE.

FIG. 4 illustrates the procedure where the UE 100 is requesting a dedicated bearer establishment (requested operation in the TAD is "add"). The P-GW 109 may verify if the UE request can be accepted and may decide whether a new dedicated bearer service should be added. Then the P-GW 109 may configure an UE specific P-GW Context and may respond to the MME 105 via the S-GW 107 accordingly with the S11: "Create Dedicated Bearer Request" message.

The MME 105 may create an S1AP: "E-RAB Setup Request" message with the E-RAB to be modified list and may send it to the (H)eNB/L-GW 101, 102. The (H)eNB may receive the radio bearer and S1-u tunnelling parameters in the S1AP: "E-RAB Setup Request" message. In order to support LIPA/SIPTO services the (H)eNB 101 may perform an additional check whether the UE 100 is allowed to use LIPA/SIPTO. Moreover, the (H)eNB 101 may configure LIPA/SIPTO policies in the eNB UE context and may prepare to assist UE 100 in its Local IP Address allocation. When a new dedicated bearer service may be configured, a UE 100 willing to use LIPA/SIPTO service may initiate an address auto-configuration procedure (DHCP or IPv6 AAC) that the (H)eNB 100 is monitoring automatically and when completed (H)eNB 100 may ignore the EPC given S1-u tunnelling parameters and may start local bridging function in L-GW 102 for the newly configured local IP address. From now on the UE may use its local IP Address for LIPA/SIPTO services and the (H)eNB may detect related traffic in uplink based on the Source Address in IP lookup.

It may be possible that these functions for establishing LIPA/SIPTO Service at EUTRAN-level could be autonomous in the UEs 100 and (H)eNBs 101 configured for LIPA/SIPTO support when no special requirements will be set to the EPC. However, the EPC may be aware of LIPA/SIPTO when some IE combination from the UE may be used to indicate LIPA/SIPTO Bearer Request when P-GW 109, or the MME 105 may return known parameters to the (H)eNB 101 in order to omit S1-u e.g. null TEID value.

FIG. 5 illustrates a procedure with UE requesting modification of an existing bearer according to an exemplary embodiment. In the UE requested bearer modification targeting to LIPA/SIPTO service establishment, it may be possible to degrade QoS and to release resources in the P-GW 109 as traffic will be off-loaded. The P-GW 109 may verify if the UE request can be accepted and may decide whether a bearer service can be modified according to the UE given TAD (Traffic Aggregate Description). Then the P-GW 109 may configure the UE specific P-GW Context and may respond to the MME 105 via the S-GW 107 accordingly with the S11: "Update Bearer Request message" (see step 5 in FIG. 5). The MME 105 may create a S1AP: "E-RAB Modify Request" message with the E-RAB to be modified list and may send it to the (H)eNB/L-GW 101,102 (see step 6 in FIG. 5).

The (H)eNB 101 may receive new radio bearer parameters in the S1AP: "E-RAB Modify Request" message as the old S1 tunnelling parameters are assumed to remain the same. In order to support LIPA/SIPTO services the (H)eNB 101 may perform an additional check whether the UE 100 is allowed to use LIPA/SIPTO, may configure LIPA/SIPTO policies in the eNB UE context and may prepare to assist the UE 100 in its Local IP Address allocation. As the UE 100 may have requested degraded QoS in order to release resources in the EPC and used bearer modification as an indication to the (H)eNB/L-GW 101,102 to prepare for LIPA/SIPTO service, the (H)eNB 101 may over-ride the EPC given E-RAB parameters and instead apply the pre-configured QoS parameters in the LIPA/SIPTO policies.

When a bearer service is modified, a UE 100 willing to use LIPA/SIPTO service may initiate address auto-configuration procedure (DHCP or IPv6 AAC) that the (H)eNB 101 is monitoring automatically and when completed may ignore the old EPC given S1-u tunnelling parameters and may start local bridging function in the L-GW 102 for the newly configured local IP address.

These functions for establishing LIPA/SIPTO Service at EUTRAN-level could be autonomous in the UEs and (H)eNBs configured for LIPA/SIPTO support when no special requirements will be set to the EPC. However, the EPC may be aware of LIPA/SIPTO when some indication could be delivered to the (H)eNB 101 during the UE requested bearer resource modification procedure. As the S1 tunnelling parameters may be not delivered in the E-RAB modification request message then some other indication should be specified and added there, or use e.g. a preceding S1AP: "UE Context Modification Request" message for preparing the (H)eNB for LIPA/SIPTO support (see step 2 in FIG. 6).

According to further exemplary embodiment of the present invention a LIPA/SIPTO Bearer Setup Procedure using Dedicated Bearer Activation may be utilized. A Bearer Activation procedure may allow the network initiated dedicated bearer service establishment when the UE already may have a PDN connection with the PDN GW (Default EPS Bearer may be activated). This procedure may be utilized to support the Dedicated LIPA/SIPTO Bearer setups within a single APN.

As the P-GW 109 in the EPC, or PCRF 113 may be not involved with the LIPA/SIPTO service the MME 105 may be assumed to make a decision whether LIPA/SIPTO Bearer should be added in the UE Context data e.g. based on UE movement to a cell/location where LIPA/SIPTO service is allowed.

Handling of the LIPA/SIPTO dedicated bearer activation procedure in control of the MME 105 may be the following: The MME 105 may be assumed to be aware of UE membership to a CSG and LIPA/SIPTO may be allowed to the UE 100. For LIPA/SIPTO bearer handling the MME 105 may include one or more profiles (reflecting (different) operator policies and or subscriber types and or (H)eNB backhaul capability) with default values on behalf of a "virtual P-GW server" for LIPA/SIPTO services. This information could be stored in a "virtual P-GW Server" for LIPA/SIPTO located in the P-GW 109 when ordinary S11 procedures can be executed. The (H)eNB/L-GW 101,102 may be assumed to be configured for LIPA/SIPTO support and may be capable to assist the UE 100 in local IP address allocation and may perform bridging between LIPA/SIPTO Bearer and "native IP" in the local IP network 108. A MME Initiated Dedicated Bearer Activation for LIPA/SIPTO Service may be triggered when the UE 100 may have entered to a (H)eNB/Cell 101 supporting LIPA/SIPTO. The MME 105 may update the eNB UE Context Data with the required LIPA/SIPTO Information prior to the actual dedicated bearer setup, see the steps 2 and 3 in FIG. 6. In order to trigger Local IP Address configuration in the UE 100 the NAS-PDU in the bearer setup request message may contain some indication e.g. in the protocol options. In order to activate LIPA/SIPTO Service in the (H)eNB 101, the E-RAB parameters may indicate that S1-u is omitted e.g. by issuing null TEID value. The MME 105 may be provided with intelligence to activate itself for providing an EPS Bearer Services.

According to another embodiment of the present invention a LIPA/SIPTO Bearer Setup Procedure using Bearer Modification may be utilized. The Bearer Modification procedure may allow the network initiated bearer service modifications when the UE 100 may already have a PDN connection with the PDN GW (Default EPS Bearer is activated). This procedure may be utilized in order to support the LIPA/SIPTO Bearer setups within a single APN.

Therefore, the MME 105 may be assumed to make a decision whether LIPA/SIPTO Bearer should be modified from one already existing EPS bearer in the UE Context data e.g. based on UE movement to a cell/location where LIPA/SIPTO service is allowed. The rest of the Bearer Modification procedure may be the same as illustrated in FIG. 5 except the MME 105 may initiate the network controlled procedure.

According to a further exemplary embodiment of the present invention a Network Triggered Service Request (Local Paging Trigger) may be utilized. Another function of the S11 interface may be to deliver the trigger for idle to active state change in case UE related downlink data may arrive in the S-GW 107. In case of LIPA/SIPTO from (H)eNB/L-GW 101, 102 the local downlink traffic may not pass the S-GW 107 or P-GW 109 located in the EPS, so some further mechanism may be needed to be specified for local paging trigger.

The assumption in Local IP Access is that the user plane for the LIPA/SIPTO service may terminate in the latest serving HeNB/L-GW 101,102 that may become kind of a local paging agent while the UE 100 may be moved to its Idle-state. It may be foreseen that the active to Idle transition the UE specific Radio Resources in the HeNB 101 may be released, UE "RAN context" data may be moved to MME 105 and S1 related resources may be released as usual. The L-GW functions and the related UE context data may be retained in the HeNB/L-GW 101, 102 including some paging token to identify the UE 100 e.g. S-TMSI.

Upon reception of UE related DL data for LIPA there may be needed a further Paging triggering message from the (H)eNB/L-GW 101, 102 to the MME 105 over the S1-MME interface after which the MME 105 may continue the UE paging procedure. As the UE-associated S1 signalling connection may be removed after the S1 Release procedure, the local paging trigger may be transferred using non-UE associated signalling. This functionality for the S1-MME interface may be combined e.g. with the S1AP: "eNB Direct Information Transfer" message like shown in FIG. 7 in step 1.

The purpose of the eNB Configuration Transfer procedure may be to transfer RAN configuration information from the (H)eNB 101 to the MME 105 in unacknowledged mode. The MME 105 may not interpret the transferred RAN configuration information. However, the S1AP: "eNB Direct Information Transfer" message or a further message may be utilized so that the message (step 1 in FIG. 7) may deliver the Local UE Paging Trigger information from the (H)eNB/L-GW 101, 102 to the MME 105 in LIPA/SIPTO services. The required information elements to identify the UE 100 and to indicate paging may be S-TMSI and cause "Downlink Data Notification".

Figure 8:
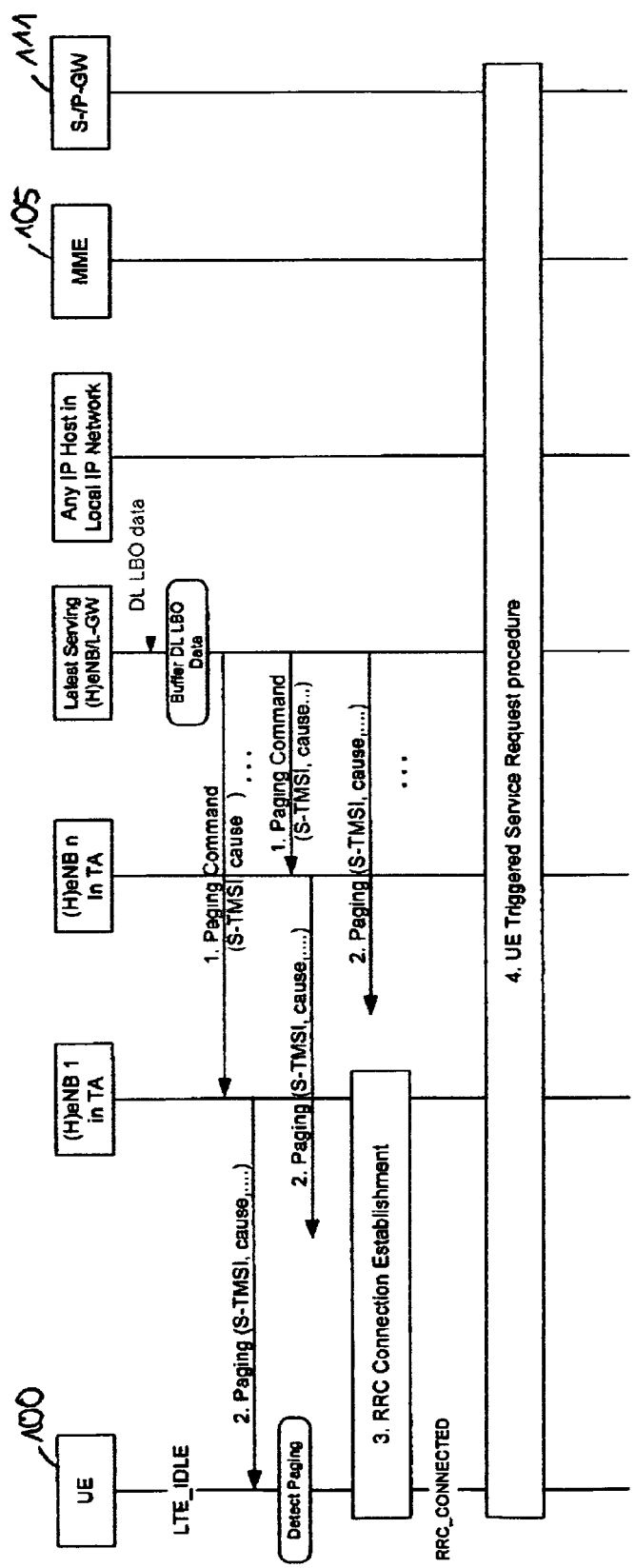
FIG. 8 illustrates a second example of a Local UE Paging Trigger controlled by (H)eNB/L-GW in LIPA/SIPTO according to an example embodiment of the present invention.

Another alternative may be to perform paging locally in the LIPA/SIPTO service area in control of the latest serving (H)eNB/L-GW 103. This may be possible in case the current S-TMSI for the UE may be available in the (H)eNB/L-GW 103. FIG. 8 illustrates the local paging procedure in EUTRAN. For local UE paging it may used a S-TMSI as an UE Identifier. A local paging may be performed transparently to the EPC.

According to another exemplary embodiment of the present invention a S1 Release Procedure with LIPA/SIPTO Services may be utilized. A S1 Release procedure may be used to release the logical S1-MME signaling connection and all radio and S1 bearers for a UE 100. It also moves the UE from ECM-CONNECTED to ECM-IDLE both in the UE 100 and MME 105, and normally all the UE related context is deleted in the (H)eNB.

In LIPA/SIPTO Services the user plane terminates in the latest serving (H)eNB/L-GW 101,102 that may be kind of a UE proxy towards the local IP network. In order to support local paging the L-GW functions and the related UE context data may be retained in the (H)eNB/L-GW 101,102 even the S1 Release Procedure may delete all UE context.

The remaining L-GW function may be a "paging agent" that may wait for a UE related downlink data and upon reception of such initiates the Network Triggered Service Request procedure like the S-GW 107 may perform usually in the EPC.

When the UE specific S1 connection may be released it means that the link between the eNB UE Context and the MME UE Context may be lost. Thus, the S1 Release Procedure may be modified so that the (H)eNB/L-GW may receive some information elements from the MME 105 that may be used to identify the UE 100 to be paged. It may be possible to store the current S-TMSI in the remaining L-GW context in the (H)eNB 101 as it may be used as the paging token in the MME 105 and the UE 100 as well.

Here it should be noted that the local paging agent function in the (H)eNB/L-GW 101, 102 may have a configurable lifetime after which all the UE related resources may be deleted.

Figure 9:
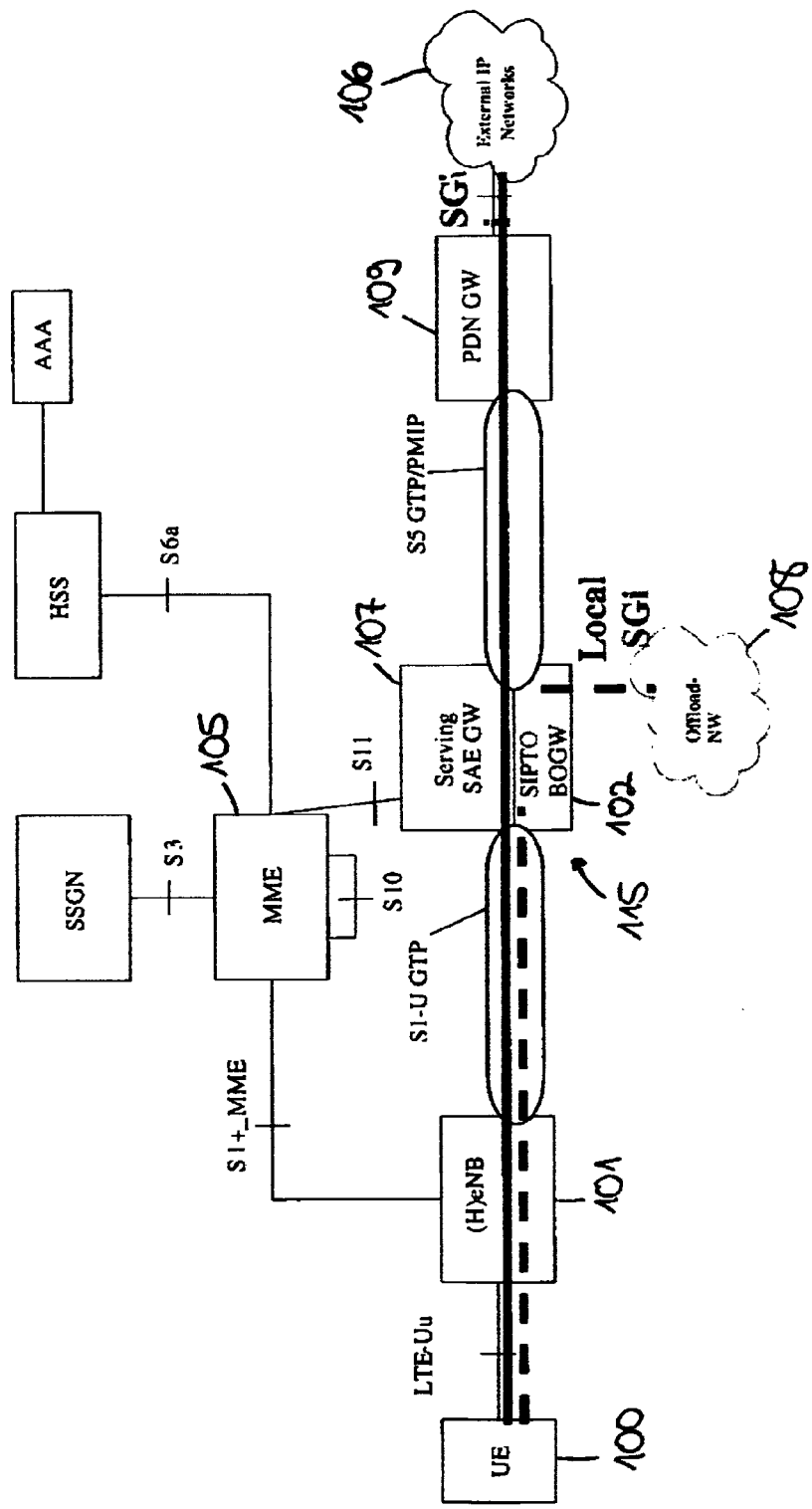
FIG. 9 illustrates a network architecture with SIPTO at a S-GW and a single PDN connection according to an example embodiment of the present invention.

According to another exemplary embodiment of the present invention there is provided a middlebox 102 or a breakout gateway 102 (BOGW) or a local Gateway 102 (L-GW) in a S-GW 107, especially a S-SAE-GW of the EPC as shown in FIG. 9. Thus, it is proposed to enhance the S-GW 107 by one or a plurality of functions of a BOGW 102. This BOGW functionality may comprise a related allocation of a second local IP Address for the UE, especially the allocation of IP address from local pool, providing DHCP (IP v4, IPv6) and or routing advertisement for the local link (IPv6). A further functionality of the BOGW 102 may be an optional enhancement of S11 control signalling with the MME 105, especially a provisioning of a second IP Address for NAS signalling MME-UE. It may also be foreseen that the MME 105 may provide control information to the S-GW 107 if the related PDN connection is subject to SIPTO. An other exemplary functionality of the BOGW may routing of uplink UE IP packets according to UE IP source address to local SGi or to PDN-GW. It may be foreseen that the BOGW may provide an inclusion of downlink local IP packets in the GTP tunnel at S1-U interface. It may also be foreseen a traffic shaping control and or a policy control to reserve a certain amount of bandwidth for the traffic flows that traverse the EPC (PDN-GW).

According to an exemplary embodiment of the invention the locally acquired IP address may be signaled in a default bearer NAS signaling/PDP context signaling. For this a field "local offload IP address" may be utilized. This would be suitable for the UE 100 to distinguish the addresses.

In a dual PDP context according to operator policy the S-GW 107 may overwrite the IPv4 or IPv6 address assigned by a P-GW, especially a PDN-GW 109 with the local address. The applications in the UE 100 may be also provided with policies and or pre-configuration, e.g. for IMS to use IPv6 addresses, that may provide the usage of the operator central PDN-GW 109 with all operator feature support, all other applications may use IPv4 addresses. This would also fit with the use of always on IPv6 addresses (need a large amount) and dynamically assigned temporary IPv4 addresses e.g. for Web browsing.

According to an exemplary embodiment of the invention the locally acquired IP address may be signaled in-band in the bearer/tunnel to the UE 100. A DHCP request or all DHCP requests from the UE 100 may be intercepted by the S-GW 107 and may handled locally, the default bearer IP Address from the PDN-GW 109, may be allocated via Session management/NAS signaling. The S-GW 107 may be injecting router advertisements for IPv6.

Thus, the S-GW may be located as BOGW using an existing gateway (GW) selection mechanisms, the subscription of the user (candidate for LBO) and the capability of the S-GW 107 to provide offload may taken into account as an additional input parameters for the S-GW selection procedure.

The S-GW as BOGW, meaning a combined network device 115, may serve also as mobility anchor. This may reduce the number of offload traffic session breaks due to mobility compared to solutions based on BS integrated SIPTO or a BOGW above BS without S-GW functionality. Only a subset of GGSN and P-GW functions may be utilized for implementing SIPTO in the S-GW 107 e.g. to perform local IP address assignment, DHCP client/server, basic charging functionality.

As a result, a legal interception of SIPTO traffic may be implemented by S-GW functionality as this may be part of the S-GW functions. Also the standard Paging functionality of the S-GW 107 may be reused for local traffic to allow the UE 100 to be activated if local downlink data arrive at the local SGi interface and the UE 100 may be in IDLE mode.

There may be not a requirement of an additional/dedicated session management and a bearer management signalling at the MME 105, the S-GW 107 and UE 100 as the function may be connected to a default bearer establishment.

Pre-defined parameters and or profiles may be user in the S-GW 107 to control the local SIPTO traffic. This may be e.g. the amount of bandwidth that the local link can acquire from the overall bandwidth resource of the PDN connection. One or more pre-defined Local IP access parameters may be pre-provisioned to a SIPTO Service function.

Figure 10:
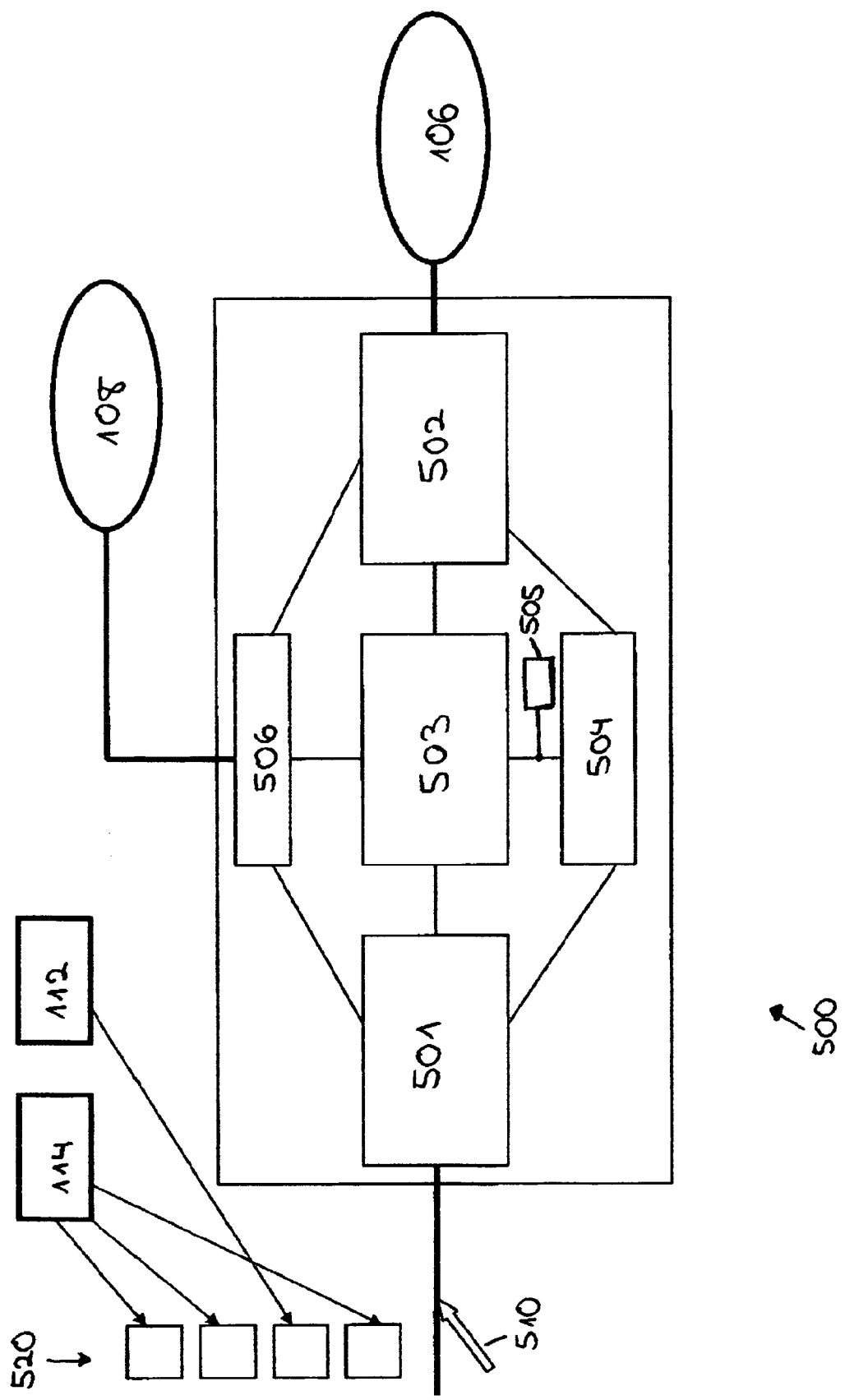
FIG. 10 illustrates a network apparatus according to an exemplary embodiment of the present invention.

FIG. 10 shows schematically an exemplary embodiment of a network device 500 comprising a receiving unit 501, a sending unit 502 and an evaluating unit 503. The receiving unit 501 may be adapted to receive a trigger signal 510 for preparing a breakout or an off-load of a plurality of packets 520. The plurality of packets 520 comprises at least one packet from a first source 112 and at least one packet from a second source 114. The evaluating unit 503 may be adapted to evaluate a received trigger signal 510 and to evaluate packets from the first source 112 and packets from the second source 114. Moreover, the evaluation unit 503 may be adapted to distinguish packets from the first source 112 and packets from the second source 114. The evaluation unit 503 may comprise a processor 504 and a memory 505 or may be connected with a processor 504 and or a memory 505. Moreover, the network device 500 may comprise a local interface 506. The local interface 506 may provide a connection to a second network 108. The sending unit 502 may be connected with the local interface 506. Moreover, the sending unit 502 may be adapted to send packets to a first network 106 and to a separate network or second network 108. The second network 108 may receive packets from a breakout of the plurality of packets 520 received by the network device 500.

Furthermore, the network devices 500 or network elements 500 and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

For the purpose of the present invention as described herein above, it should be noted that:
  an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims Although specific terms are employed herein, they are used in a generic and descriptive sense only and not for purposes of limitation.

It should be noted, that reference signs in the claims shall not be construed as limiting the scope of the claims.

List of Abbreviations
3GPP=Third Generation Partnership Project
APN=Access Point Name
ARP=Address Resolution Protocol
BOGW=breakout gateway
CN=Core Network
CSG=Closed Subscriber Group
DAD=Duplicate Address Detection
DL=downlink
DHCPv4=DHCPv4=Dynamic Host Configuration Protocol (version 4)
DHCP(v6)=DHCPv6=Dynamic Host Configuration Protocol (version 6)
ECM=Error Correction Mode
eNB=enhanced node B
EPC=Evolved Packet Core
EPS=Evolved Packet System
E-RAB=Evolved Radio Access Bearer
E-UTRAN=Evolved UTRAN=Evolved Universal Terrestrial Radio Access Network
GPRS=general packet radio service
GTP=GPRS Tunnelling Protocol
GW=gateway
GGSN=Gateway GPRS Support Node
HeNB=Home eNodeB
IMSI=International Mobile Subscriber Identity
IETF=Internet Engineering Task Force
IP=Internet Protocol
IP(v6/v4)=Internet Protocol (version 6/version 4)
LAN=area network
LBO=Local BreakOut
LTE=Long-Term Evolution LIPA=Local IP Access
L-GW=Local Breakout Gateway
L-SGi=Local SGi-interface
L2TPv3=Layer 2 Tunneling Protocol version 3
MME=Mobility Management Entity
MNO=Mobile Network Operator
MTU=Maximum Transmission Unit
NAT=Network Address Translation
NAS=Non-Access Stratum
PPP=point-to-point protocol
PDN=Packet Data Network
PDN GW/P-GW=Packet Data Network Gateway
PDP=Packet Data Protocol
PGW=Packet Data Gateway
QoS=Quality of Service
RAN=Radio Access Network
RAS=Radio Access Signaling
SAE=System Architecture Evolution
STUN=Simple Traversal of User Datagram Protocol (RFC3489)
SIPTO=Selected IP Traffic Offload
S-GW=Serving Gateway
S-TMSI=S-Temporary Mobile Subscriber Identity
TEID=Transport Endpoint Identifier
UE=User Equipment
UL=uplink

The invention claimed is:

1. A method, comprising:
intercepting a Dynamic Host Configuration Protocol Request from a user equipment;
allocating, by a serving gateway or a local breakout gateway, a local internet protocol address for the user equipment;
receiving, by the serving gateway or the local breakout gateway, packets from the user equipment via a single bearer service, wherein at least some of the packets are received from a default bearer internet protocol address and at least some of the packets are received from the local internet protocol address corresponding to the user equipment;
distinguishing the packets received from the local internet protocol address from the packets received from the default bearer internet protocol address; and
breaking out the packets received from the local internet protocol address from the bearer service to a separate network.

2. The method according to claim 1, further comprising: forwarding packets received from the default bearer internet protocol address to a server via the bearer service.

3. The method according to claim 1, wherein the allocating comprises signalling the local internet protocol address to the user equipment via Non-Access-Stratum signalling/Packet-Data-Protocol context signalling.

4. The method according to claim 1, wherein the allocating comprises signalling in-band the local internet protocol address to the user equipment.

5. The method according to claim 1, wherein the breakout is network initiated.

6. The method according to claim 1, wherein the breakout is initiated by the user equipment.

7. The method according to claim 1, further comprising injecting router advertisements for IPv6.

8. An apparatus, comprising:
at least one processor; and
at least one memory including computer program code, the at least one memory and the computer program code configured, with the at least one processor, to cause the apparatus at least to
intercept a Dynamic Host Configuration Protocol Request from a user equipment;
allocate a local internet protocol address for the user equipment;
receive packets from the user equipment via a single bearer, wherein at least some of the packets are received from a default bearer internet protocol address and at least some of the packets are received from the local internet protocol address corresponding to the user equipment;
distinguish the packets received from the local internet protocol address from the packets received from the default bearer internet protocol address; and
break out the packets received from the local internet protocol address from the bearer service to a separate network, wherein the apparatus comprises a serving gateway or a local breakout gateway.

9. The apparatus according to claim 8, wherein the apparatus is further caused to forward packets received from the default bearer internet protocol address to a server via the bearer service.

10. The apparatus according to claim 8, wherein the allocating comprises signalling the local internet protocol address to the user equipment via Non-Access-Stratum signalling/Packet-Data-Protocol context signalling.

11. The apparatus according to claim 8, wherein the allocating comprises signalling in-band the local internet protocol address to the user equipment.

12. The apparatus according to claim 8, wherein the breakout is network initiated.

13. The apparatus according to claim 8, wherein the breakout is initiated by the user equipment.

14. The apparatus according to claim 8, wherein the apparatus is further caused to inject router advertisements for IPv6.

15. A computer program product, embodied on a non-transitory computer readable medium, the computer program product configured to control a processor to perform a process, comprising:
intercepting a Dynamic Host Configuration Protocol Request from a user equipment;
allocating, by a serving gateway or a local breakout gateway, a local internet protocol address for the user equipment;
receiving, by the serving gateway or the local breakout gateway, packets from the user equipment via a single bearer service, wherein at least some of the packets are received from a default bearer internet protocol address and at least some of the packets are received from the local internet protocol address corresponding to the user equipment;
distinguishing the packets received from the local internet protocol address from the packets received from the default bearer internet protocol address; and
breaking out the packets received from the local internet protocol address front the bearer service to a separate network.

16. The computer program product according to claim 15, wherein the process further comprises
forwarding packets received from the default bearer interne protocol address to a server via the bearer service.

17. The computer program product according to claim 15, wherein the allocating comprises signalling the local internet protocol address to the user equipment via Non-Access-Stratum signalling/Packet-Data-Protocol context signalling.

18. The computer program product according to claim 15, wherein the allocating comprises signalling in-band the local internet protocol address to the user equipment.

19. The computer program product according to claim 15, wherein the breakout is network initiated.

20. The computer program product according to claim 15, wherein the breakout is initiated by the user equipment.

21. The computer program product according to claim 15, wherein the process further comprises injecting router advertisements for IPv6.

* * * * *